(12) United States Patent
Tagami et al.

(10) Patent No.: US 6,340,145 B1
(45) Date of Patent: Jan. 22, 2002

(54) COMPUTER FASTENING DEVICE

(75) Inventors: Mitsuhiro Tagami; Masayuki Terao, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/376,499

(22) Filed: Aug. 18, 1999

(30) Foreign Application Priority Data

Aug. 19, 1998 (JP) ............................................. 10-232677

(51) Int. Cl.[7] .............................. A47F 1/10; A47H 1/10; A47N 37/00
(52) U.S. Cl. ................... 248/317; 248/295.11; 248/918; 248/225.21; 108/26; 108/50.02
(58) Field of Search ................................. 248/317, 201, 248/207, 224.8, 225.21, 310, 918, 318, 339, 552, 295.11; 211/106, 119, 181.1; 108/50.02, 26

(56) References Cited

U.S. PATENT DOCUMENTS

| | | | | |
|---|---|---|---|---|
| 4,480,810 A | * | 11/1984 | Hall ............................. | 248/238 |
| 4,524,475 A | * | 6/1985 | Valentino ........................ | 5/507 |
| D296,887 S | * | 7/1988 | Walling et al. ............. | D12/203 |
| 4,858,878 A | * | 8/1989 | Gassaway .................... | 248/551 |
| 5,131,620 A | * | 7/1992 | Boundy ....................... | 248/674 |
| 5,590,607 A | * | 1/1997 | Howard ........................ | 108/98 |
| 5,639,060 A | * | 6/1997 | Spoonts et al. ............. | 248/683 |
| 5,683,066 A | * | 11/1997 | McCann ................. | 248/295.11 |
| 5,876,002 A | * | 3/1999 | White et al. ................. | 248/118 |
| 5,961,084 A | * | 10/1999 | Brand et al. ................. | 248/248 |
| 6,095,057 A | * | 1/2000 | Corban ......................... | 108/42 |
| 6,029,580 A | * | 2/2000 | Alfonso et al. ................ | 108/26 |
| 6,098,944 A | * | 8/2000 | Pangborn et al. ........... | 248/317 |

FOREIGN PATENT DOCUMENTS

| | | |
|---|---|---|
| JP | 59-40930 | 3/1984 |
| JP | 59-187834 | 12/1984 |
| JP | 11-154034 | 6/1999 |

* cited by examiner

*Primary Examiner*—Anita King
(74) *Attorney, Agent, or Firm*—Foley & Lardner

(57) ABSTRACT

To place a desktop computer effectively on a desk, a desk fastening member is located so that it encloses an edge of a top of the desk and the desk fastening member is fastened to the desk by tightening screws. Hooks of a computer holding member are engaged in holes of an extending member of the desk fastening member from an inside I of a kneehole of the desk, and then, the computer's main body is held in a space outside of the kneehole.

7 Claims, 3 Drawing Sheets

COMPUTER FASTENING DEVICE

BACKGROUND OF THE INVENTION

1. Field of the Invention

The present invention relates to a computer fastening device for fastening a computer to a desk.

This application is based on Japanese Patent Application No. Hei 10-232677, the contents of which are incorporated herein by reference.

2. Description of Related Art Including Information Disclosed under 37 CFR 1.97 and 37 CFR 1.98

At present, two types of computer are generally used, desktop (personal) computers and laptop (personal) computers. Recently, liquid crystal displays (LCDs) for computers have been developed as an alternative to cathode-ray tube (CRT) displays, so that the laptop computers using the liquid crystal displays are on the market. The size of the display of the desktop computer is miniaturized to A4 paper size when substituting the liquid crystal display used on laptop computers for the CRT displays, and desktop computers having a liquid crystal display are also on the market.

However, even if the computer is miniaturized as stated above, for desktop computers, both the liquid crystal display and the computer's main body are generally placed on the desk, and an area for accommodating only the desktop computer is required. Therefore, since the area occupied by the computer (which is hereinafter called "occupied area") and a dead space are made on the desk, the desk cannot be effectively used.

A rack specially for accommodating a desktop computer is on the market. However, when the desktop computer is set on the rack, which is not placed on the desk but by the desk, the user cannot use the desktop computer while facing the desk.

Furthermore, a desk for storing a personal computer comprising a wagon which can move and a cabinet separated from the wagon (that is disclosed in Japanese Utility Model application No. Sho 59-187834) is also used. However, there is not sufficient working space on the personal computer storing desk and another working desk is required. Therefore, the user cannot use the desktop computer while facing the desk.

To reduce the occupied area of a desktop computer on a desk, due to circumstances such as a limited office area or the like, the laptop computers may be used instead of desktop computers. However, desktop computers are preferable to laptop computers for the following reasons 1 to 4.
1. In offices, computers are often used as a fixed type, on the desk, and not as a mobile type.
2. The desktop type is superior to the laptop type on a cost/performance basis (which means a low cost, a high speed, technical advancement, or the like), and for the expandability required for computers used on a network or the like.
3. Desktop computers are used more often than laptop computers at present.
4. Since desktop computers have a separate monitor, keyboard, and mouse, various demands from customers can be flexibly met.

Therefore, the desktop computers are required to be provided effectively on a desk, that is, to make the occupied area smaller.

SUMMARY OF THE INVENTION

An object of the present invention is to provide a computer fastening device for fastening a computer to a desk so that a desktop computer is effectively provided on the desk.

To achieve the aforesaid object, the present invention relates to a computer fastening device for fastening a computer to a desk, comprising: a desk fastening member to be detachably fastened to an edge of a top of a desk; and a computer holding member extending downward from the desk fastening member and having a computer support face for supporting a computer thereon.

The computer holding member may hold the computer in a kneehole of a desk.

The computer holding member may hold the computer in a location other than the kneehole of a desk.

The computer holding member may be provided so as to allow unobstructed access to the front face of the computer.

The desk fastening member may be a clamp holding the top of the desk therebetween.

The desk fastening member may be detachably engaged to the computer holding member.

The desk fastening member may have a first engaging portion, the computer holding member may have a second engaging portion, and the first engaging portion and the second engaging portion may detachably engage each other.

The computer holding member may have a side plate extending downward from the desk fastening member and a bottom plate extending horizontally from the bottom of the side plate.

The computer fastening device for fastening a computer may comprise a stopper formed at an edge of the bottom plate which is opposite the side plate, to prevent the computer from overturning or falling.

According to the present invention, since an unused space in the desk is utilized to place the computer's main body, the occupied area can be greatly reduced, to laptop computer size or smaller.

DESCRIPTION OF THE PREFERRED EMBODIMENTS

In the following, embodiments of the present invention are explained referring to the figures.

Figure 4:
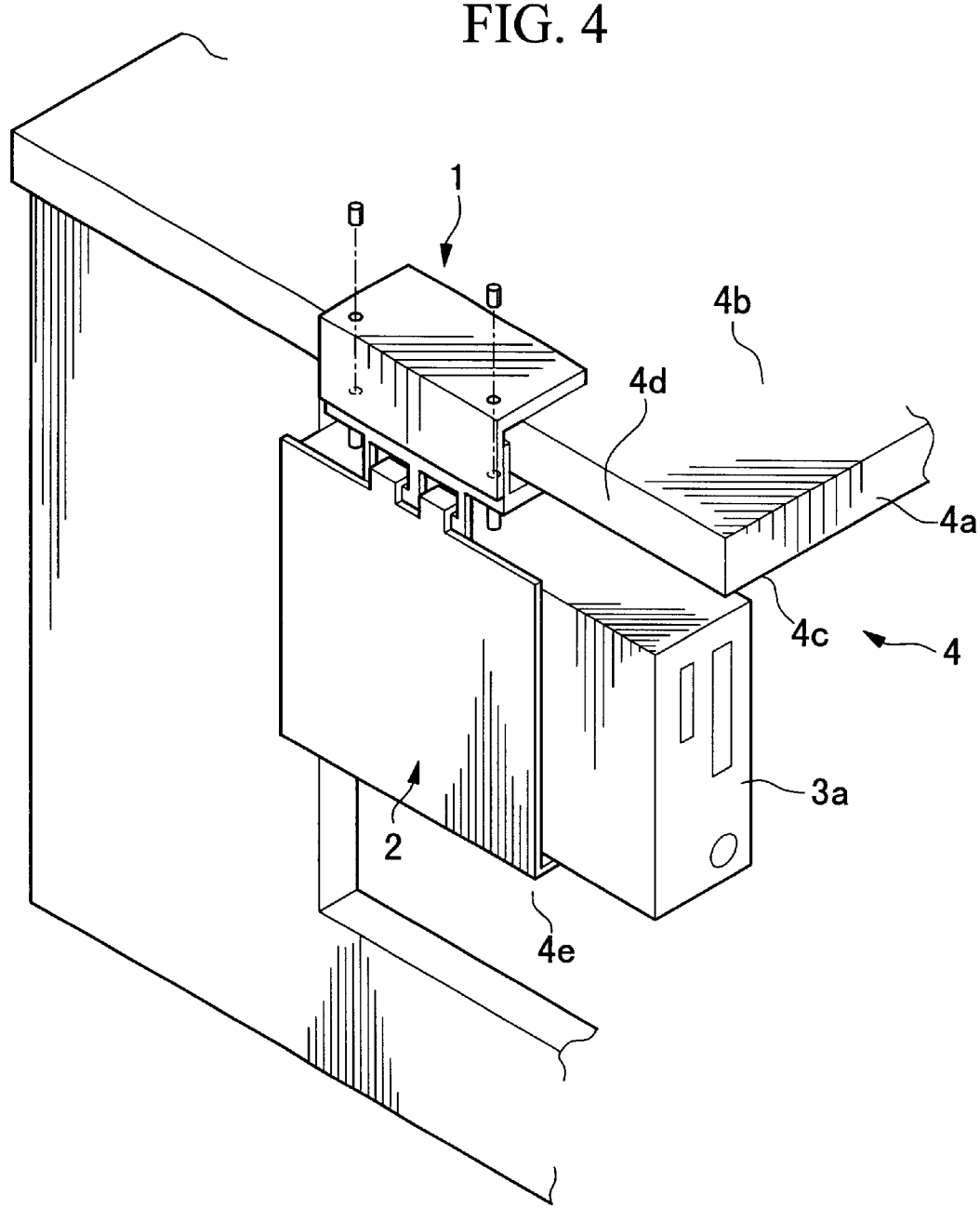
FIG. 4 is a perspective view showing a computer fastened to a desk by the computer fastening device of FIG. 1.

As shown in FIG. 4, the computer fastening device for fastening the computer to the desk is mounted on the desk according to an embodiment of the present invention. The computer fastening device comprises the desk fastening member 1 and the computer holding member 2. The desktop computer is composed of a display (which is not illustrated) and the computer's main body 3a. The computer's main body 3a is put on and supported by the computer holding member 2 and the computer holding member 2 with the computer's main body 3a is detachably engaged to the desk fastening member 1, which is fastened to the desk 4, so that the computer's main body 3a with the computer holding device is placed in an unused area of the desk 4. The desk fastening member 1 is fastened by locating it so that a top face 4b, a back face 4c, and a side face 4d, which is adjacent to a front face 4a, of the edge of the top of the desk are enclosed by it.

Figure 2:
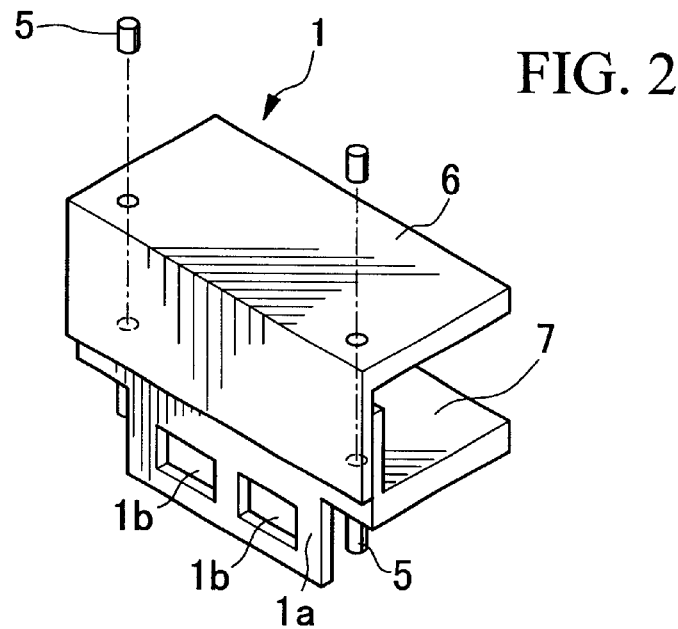
FIG. 2 is a perspective view of the desk fastening member of the computer fastening device of FIG. 1.

As shown in FIG. 2, the desk fastening member 1 comprises an L-shaped upper desk fastening member 6, which contacts the top face 4b of the top of the desk 4, and an L-shaped lower desk fastening member 7, which contacts the back face 4c of the top of the desk 4. The upper desk fastening member 6 and the lower desk fastening member 7 overlap each other so that the edge of the top of the desk 4 is held therebetween vertically. This overlapped part can be vertically adjusted according to the thickness of the edge of the top of the desk 4. The upper desk fastening member 6 and the lower desk fastening member 7 are provided with holes for screws 5. Since the screws 5 are vertically tightened in the holes, the desk fastening member 1 is fixed to the edge of the top of the desk 4. An extending member 1a is extended downward from the lower desk fastening member 7 and engaging holes 1b are provided in the extending member 1a.

Figure 3:
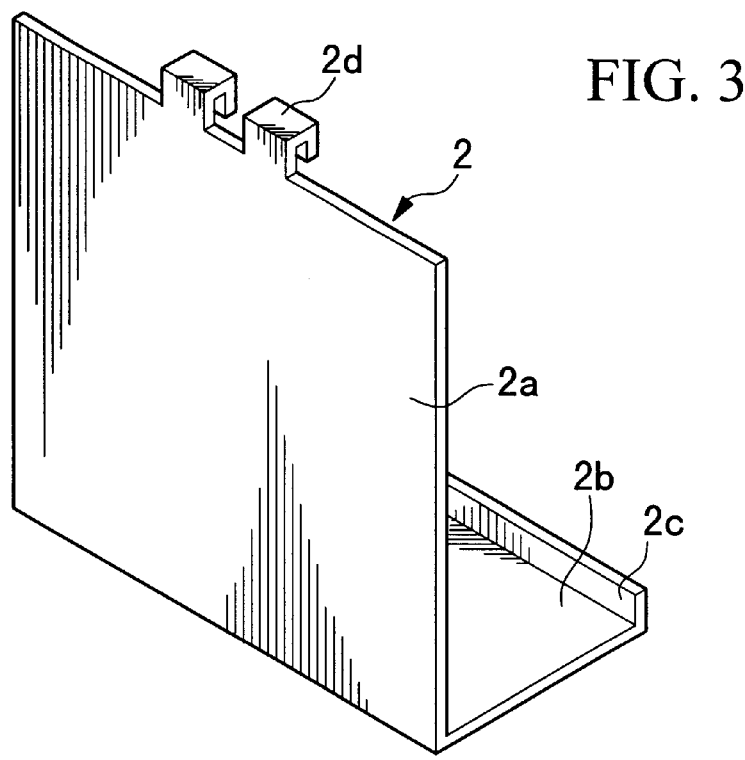
FIG. 3 is a perspective view of the computer holding member of the computer fastening device of FIG. 1.

As shown in FIG. 3, the computer holding member 2 comprises a side plate 2a which downward extends from the desk fastening member 1, a bottom plate 2b which horizontally extends from the bottom of the side plate 2a, and a stopper 2c which vertically extends from the edge of the bottom plate 2b. In this case, though the computer's main body 3a stands upright on the bottom plate 2b, it may also be held horizontally. One side of the computer's main body 3a is supported by the side plate 2a to prevent overturning, the bottom of the computer's main body 3a contacts the bottom plate 2b which bears the weight of the computer's main body 3a, and the opposite side of the computer's main body 3a is supported by the stopper 2c to prevent overturning or falling away from the side plate 2a.

The size of each of the side and bottom plates 2a, 2b and the stopper 2c can be changed so as to correspond to the length, wide, and depth of the computer's main body 3a.

Furthermore, a computer holding member need not be provided at the front face of the computer's main body 3a, which is provided with input-output devices such as a floppy disc drive, a CD-ROM drive, or the like, and a power switch, or the like, so as to allow unobstructed operation. Moreover, a computer holding member may be provided at the front face so as to open and shut freely. If operations of the input-output device or the power are not required, a computer holding member such as a plate may be provided for the front face.

The computer's main body 3a may be held horizontally, and the sizes of the side and bottom plates 2a, 2b and the stopper 2c are suitably changed.

Figure 1:
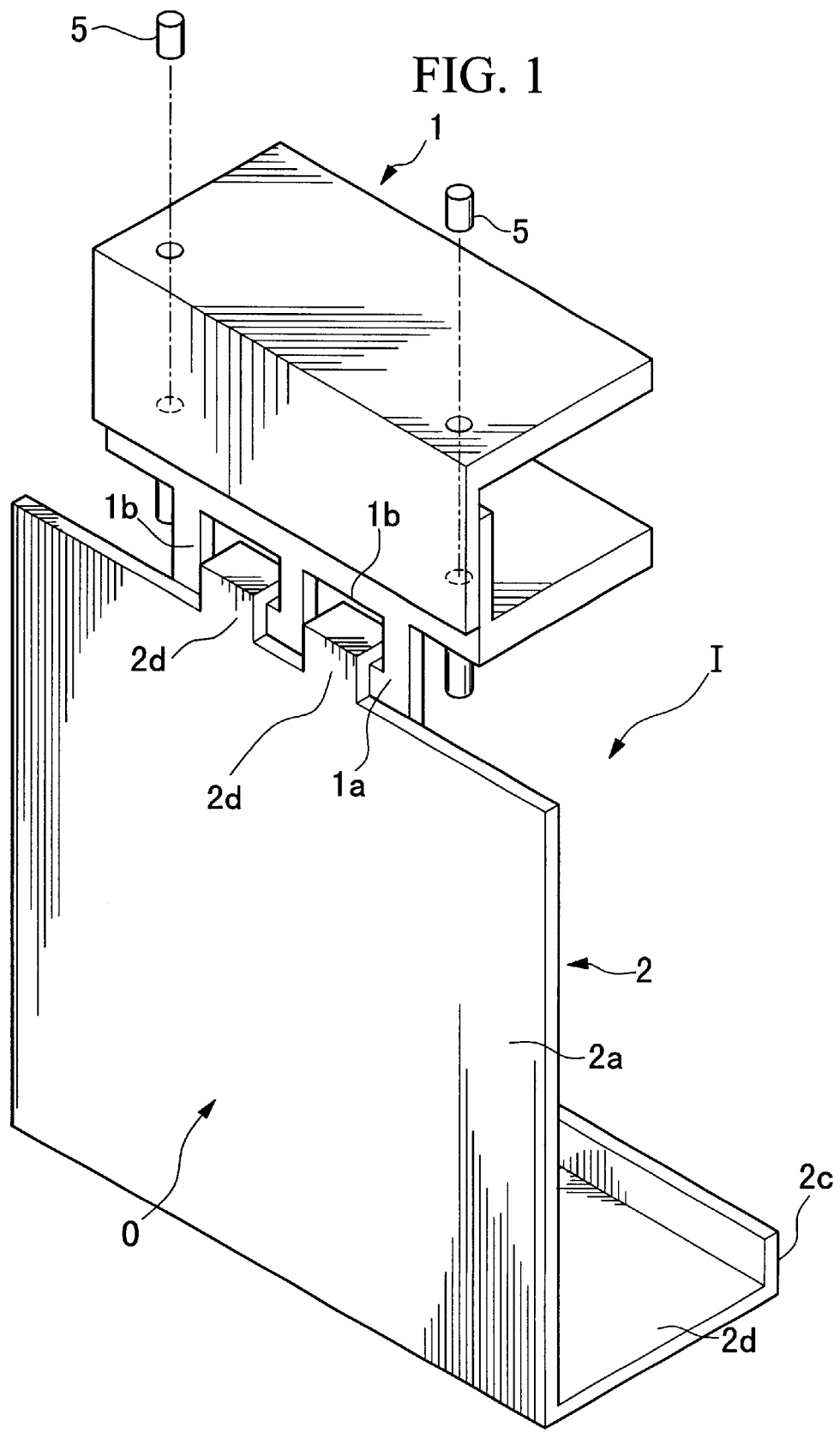
FIG. 1 is a perspective view of the computer fastening device for fastening a computer to a desk according to an embodiment of the present invention.

As shown in FIG. 1, the engaging holes 1b of the extending member 1a are engaged with the hooks 2d of the computer holding member 2, that the computer holding member 2 and the desk fastening member 1 are engaged to work as a computer fastening device. The hooks 2d may be engaged in the holes 1b from the outside O of the kneehole, then the computer's main body 3a is held in a space 4e inside the kneehole. Furthermore, the hooks 2d may be engaged in the holes 1b from the inside I of the kneehole, then the computer's main body 3a is held in a space outside of the kneehole.

In the embodiment of the present invention, although the computer holding member 2 is detachably engaged to the desk fastening member 1, the desk fastening member 1 and the computer holding member 2 may be engaged and fixed to each other or may be molded in one body. Moreover, the computer holding member 2 may also be directly fastened to the desk.

What is claimed is:

1. A computer fastening device for fastening a computer to a desktop of a desk, comprising:

a desk fastening member for detachably fastening to an edge of the desktop; and a computer holding member having a side plate extending downwardly from the desk fastening member and having a bottom plate extending laterally from the side plate for supporting the computer thereon, wherein the computer holding member is detachably connectable to the desk fastening member at an upper part of the side plate, and the computer holding member is positionable at a first position relative to the desk fastening member where the support is adapted to face inside of a kneehole of the desk and at a second position relative to the desk fastening member where the support is adapted to face outside of the kneehole.

2. A computer fastening device according to claim 1, wherein the computer holding member allows unobstructed access to a front face of the computer when the computer fastening device is attached to the desktop.

3. A computer fastening device according to claim 1, wherein the desk fastening member is a clamp adapted to be clamped around the desktop.

4. A computer fastening device according to claim 1, wherein the desk fastening member has a first engaging portion, the computer holding member has a second engaging portion, and the first engaging portion and the second engaging portion are detachably engagable.

5. A computer fastening device according to claim 1, wherein the bottom plate extends horizontally from the bottom of the side plate.

6. A computer fastening device according to claim 5, wherein the computer holding member further includes a stopper formed at an edge of the bottom plate, opposite to the side plate, adapted to prevent the computer from overturning or falling.

7. A computer fastening device according to claim 4, wherein the first engaging portion comprises at least one hole and the second engaging portion comprises at least one hook that engages the at least one hole.

\* \* \* \* \*